Figure 8:
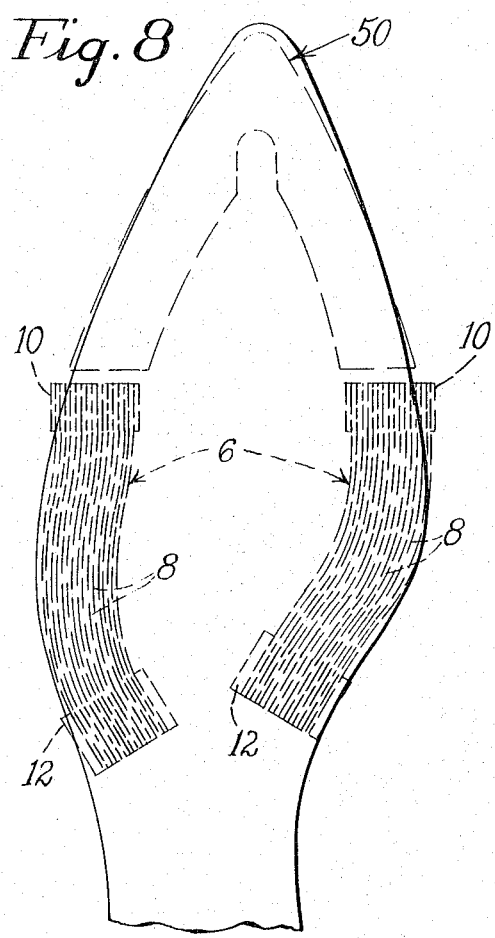

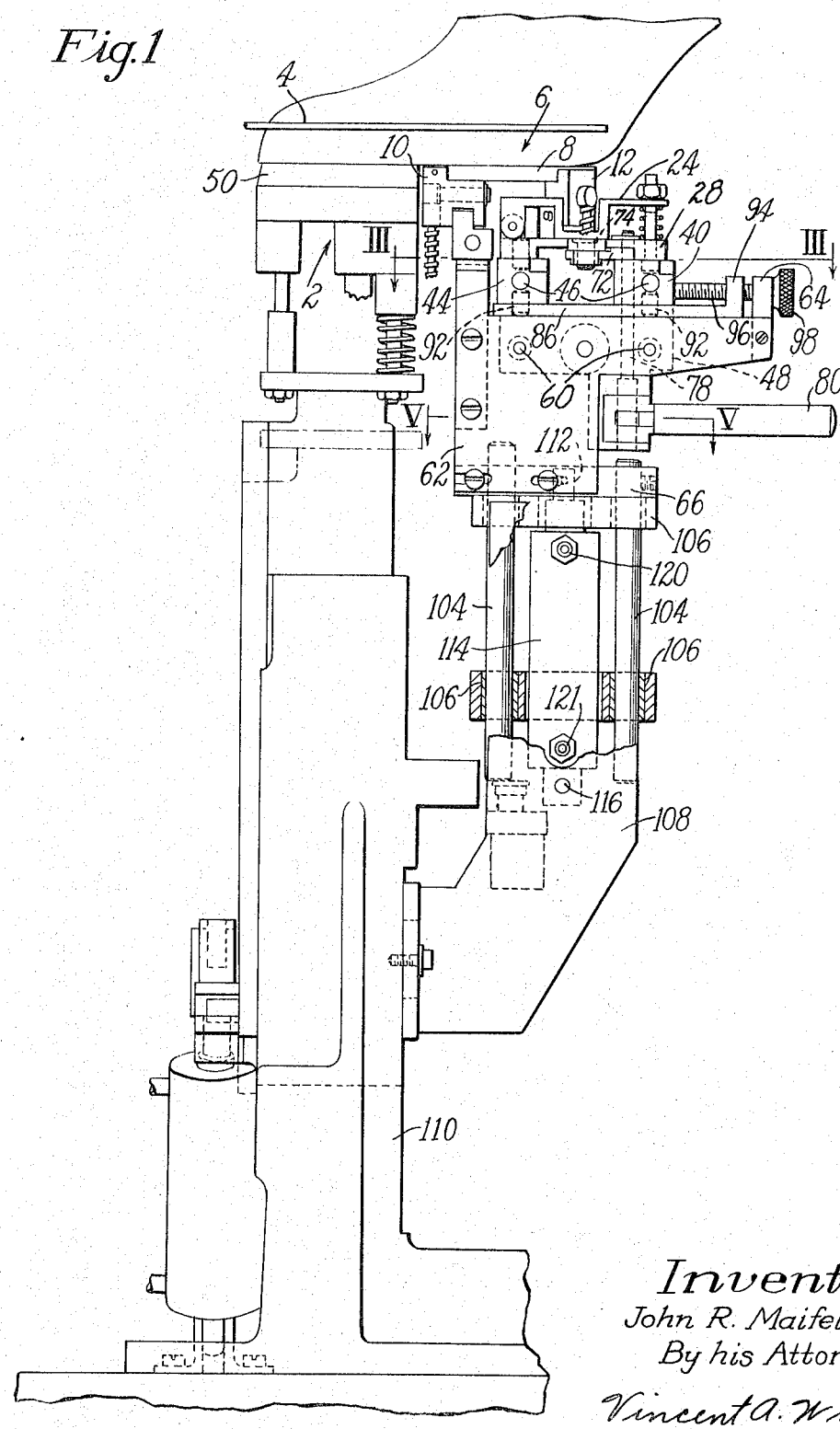

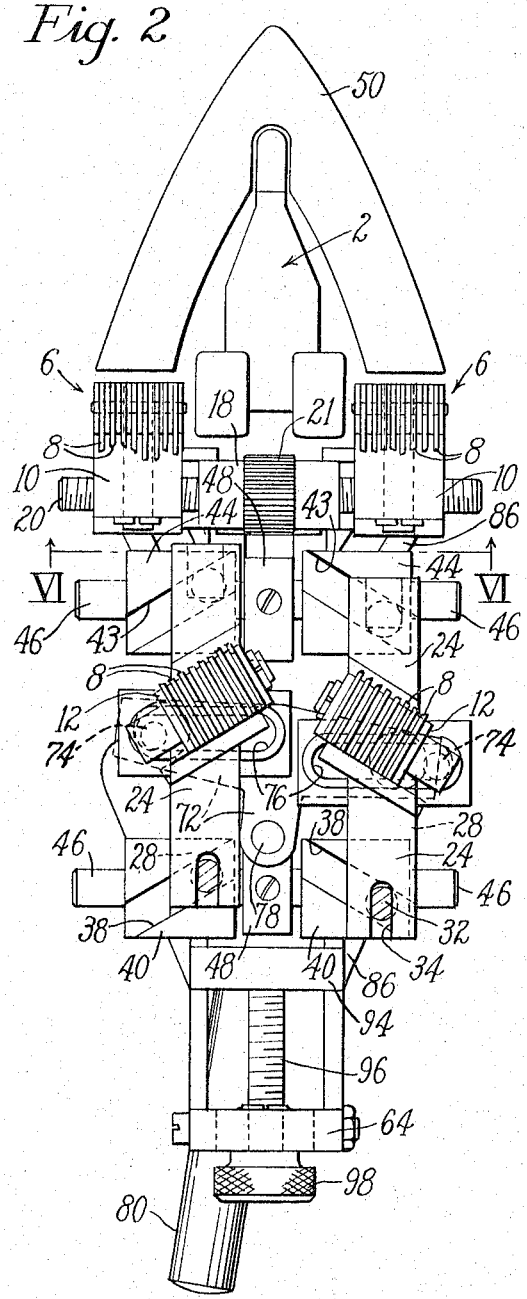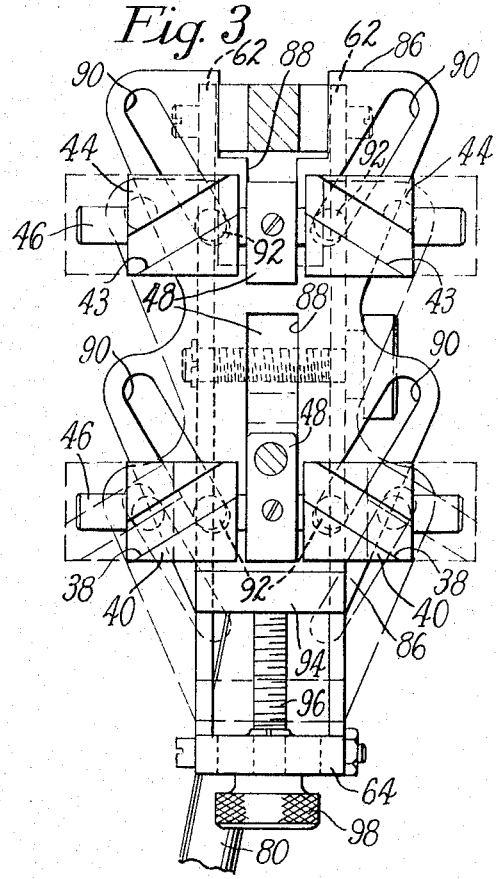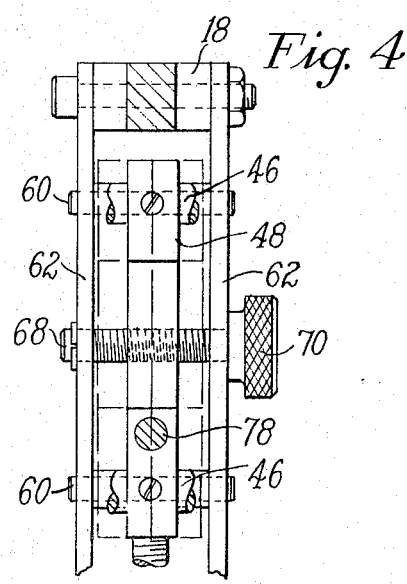

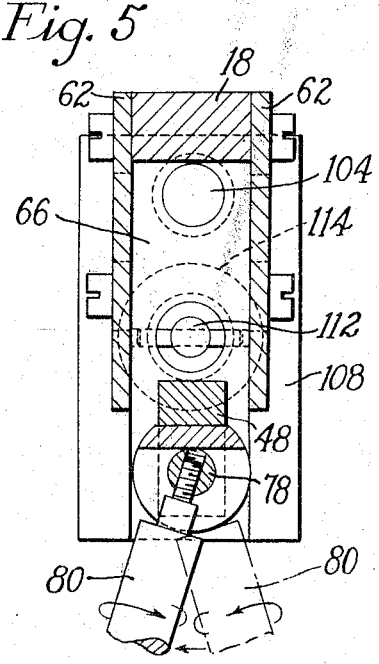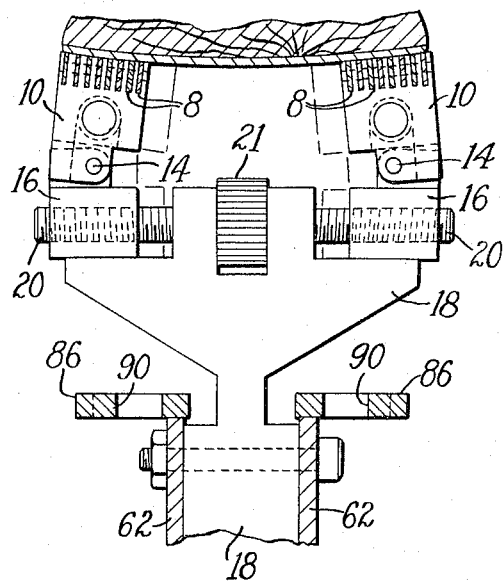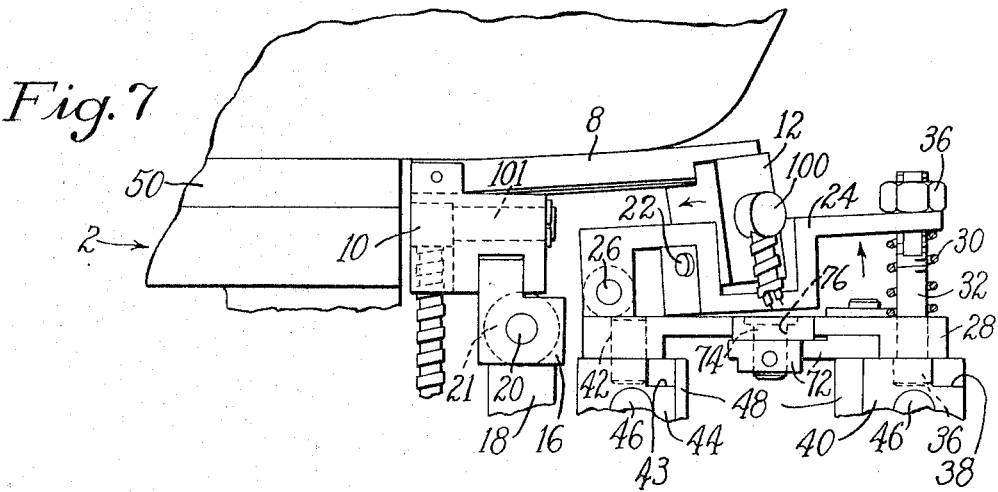

3,302,225
ADHESIVE ACTIVATING APPARATUS
John R. Maifeld, Jr., Lynn, Mass., assignor to United Shoe Machinery Corporation, Boston, Mass., a corporation of New Jersey
Filed June 7, 1966, Ser. No. 555,721
11 Claims. (Cl. 12—10.5)

This invention relates generally to machines for lasting shoes and more particularly is directed to means for activating thermoplastic adhesive on the insole of a shoe during a lasting operation. A typical machine to which the invention may be applied is shown in U.S. Patent No. 3,164,852, granted January 12, 1965, upon application of R. M. Bowler et al. It is to be understood, however, that the scope of the present invention is not limited to the particular mechanism or the organization shown.

Due to their superior characteristics, thermoplastic adhesives have found increasing use in the lasting of shoes, particularly in securing the margins of lasted shoe uppers to the undersides of insoles. In a preferred method of lasting shoes, the marginal forepart area of an insole bottom is precoated with thermoplastic adhesive which is allowed to solidify. The precoated insole is assembled on a last with a shoe upper and placed in a machine such as described in the above patent. The upper is formed about the last and the precoated adhesive on the insole bottom is heat activated to a molten condition for securing the margin of the upper after it is wiped inwardly over the insole bottom.

One of the most efficient means of activating such adhesive involves direct contact of a heated surface upon the precoated adhesive. Such direct contact is most easily achieved at the toe end of the bottom of the generally flat forepart of the insole where marginal curvatures are not severely variable between a wide range of shoe sizes and styles. The marginal contour of the remainder of the flat forepart extending heelwardly to the ball line of the shoe, however, varies considerably between sizes, styles and rights and lefts. For this reason it has been difficult to heat activate the adhesive on the remainder of the forepart area of the insole by direct contact, resulting in the use of a different adhesive which can be activated outside the machine and not having the advantages of thermoplastic adhesive.

Accordingly, it is a general object of the invention to extend the advantages of thermoplastic adhesive to the lasting of the entire forepart region of shoes by providing means for activating precoated thermoplastic adhesive at the heelward end of the forepart by direct contact with heated surfaces. To this end the machine is provided with heat activating means comprising flexible heated surfaces which are easily varied to suit the marginal contour of the forepart of the insole bottom.

In accordance with one feature the heated activating surfaces are formed by a plurality of flexible bands, the edges of which form closely spaced extended lands which are easily flexed to follow the marginal contour of the insole bottom. Another feature provides means for setting the widthwise disposition of the bands to suit various shoe sizes. To these ends, the bands are carried at their opposite ends by blocks which are adjustable widthwise differentially at opposite sides of the shoe bottom to cause the bands to bend to suit the marginal contour of the insole.

According to a further feature the blocks are movable differentially along predetermined lines angularly disposed with respect to the center line of the shoe bottom. By selectively setting the blocks after initial adjustment the bands may be disposed to operate on right or left shoes.

The above and other features of the invention, together with novel details of construction and combinations of parts will now be described with reference to the drawings and thereafter particularly pointed out in the claims.

Figure 9:
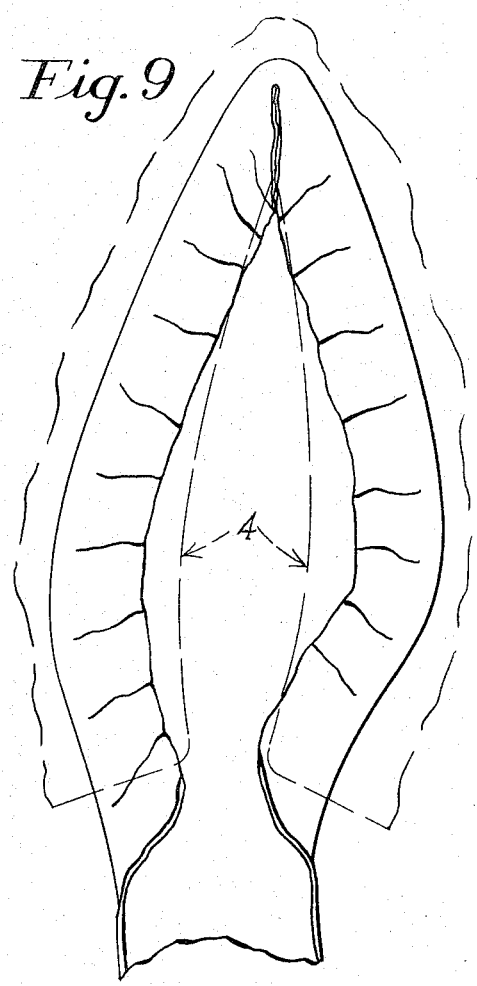

In the drawings:
FIG. 1 is a side elevation of a shoe supporting and heat activating means for the machine shown in said patent and embodying the present invention;
FIG. 2 is a plan view of the mechanism of FIG. 1;
FIG. 3 is a section substantially on line III—III of FIG. 1;
FIG. 4 is a view similar to FIG. 3 with parts removed to disclose underlying mechanism;
FIG. 5 is a section on line V—V of FIG. 1;
FIG. 6 is a section on line VI—VI of FIG. 2 showing the disposition of the activating bands with a shoe in the machine;
FIG. 7 is a side elevation in enlarged scale of a portion of the mechanism shown in FIG. 1;
FIG. 8 is a view showing the outline of a shoe bottom with the heat activating surfaces superimposed in phantom; and
FIG. 9 is a view of the shoe bottom with the forepart wipers superimposed thereon in their final inwiping positions.

A typical machine to which the heat activating unit of the present invention may be applied is described in said U.S. Patent No. 3,164,852. The machine includes a shoe rest 2 (FIGS. 1, 2 and referred to by the same reference character in said patent) which supports a last on which an upper and an insole is loosely assembled to position the last heightwise as well as to support it against the action on the upper of a toe gripper and a plurality of side grippers (not shown). The machine is also provided with wipers 4 (FIGS. 1 and 9) which act after the grippers have tensioned the upper to wipe the upper downwardly over the sides of the last and inwardly over the bottom of the insole on the last.

As previously stated, the generally flat portion of the forepart of the insole is precoated with thermoplastic adhesive which has been allowed to solidify. Before the wipers wrap the margin of the upper inwardly over the bottom of the insole, the solidified adhesive must be heat activated to a molten state. To this end, the machine is provided with a modified, V-shaped, heated member 50 on which rests the margin of the toeward end of the generally flat portion of the insole bottom. This member acts to heat activate the adhesive at the toe end of the insole in the manner described in an application for U.S. patent, Serial No. 462,602, filed June 9, 1965. The operation of the member 50 forms no part of the present invention and it should be sufficient to state that the member 50 is moved heightwise for engagement with the insole to activate the adhesive thereon and is moved downwardly when the wipers act to wipe the margin of the upper at the toe end inwardly over the insole bottom.

For activating the adhesive on the heelward end of the generally flat forepart of the insole the machine is provided with two groups 6 (FIG. 8) of flexible bands 8, the upper edges of which are adapted to engage the margin at opposite sides of the insole bottom. At their toeward ends the bands are mounted in slotted holders 10 and at their heelward ends by holders 12. The holders 12 are angularly disposed with respect to the holders 10 as best seen in FIGS. 2 and 8 imparting curvatures to the bands which generally follow the marginal contour of the insole.

The holders 10, FIG. 6, are mounted for swinging movement on pins 14 in slides 16 carried on a bracket 18. The pivotal connections of the holders 10 permit the upper edges of the bands 8 to adapt themselves to any lateral curvature of the shoe bottom as seen in FIG. 6.

The slides 16 have threaded bores receiving the oppositely threaded ends of an adjusting screw 20. The screw 20 is mounted for rotation in upstanding lugs of the bracket 18 and has a knurled portion 21 for manual rotation to adjust the holders 10 carrying the toeward ends of the bands inwardly or outwardly to suit the width of the shoe to be operated upon.

The holders 12 (FIGS. 2 and 7) at the heelward ends of the bands are pivoted at 22 on a member 24 mounted at one end on a pin 26 carried by a bridge 28. The heelward end of the member 24 is urged upwardly by a spring 30 on a threaded pin 32 upstanding from the bridge 28 and received in a slot 34 in the member 24. A nut 36 acts to limit the heightwise movement of the member 24 and hence also limits the movement of the heelward ends of the bands 8. The pivotal mounting of the member 24 permits the bands to accommodate themselves to any heightwise curvature lengthwise of the shoe forepart. The pin 32 is also provided with a head 36 which projects downwardly into a groove 38 in the upper face of a slide 40. The toeward end of the bridge 28 is provided with a depending pin 42 projecting into a similar groove 43 in a slide 44. The slides 40 and 44 are mounted for widthwise movements on two rods 46 extending outwardly from a bracket 48. The bracket is mounted for sliding movements on a pair of rods 60 (FIGS. 1 and 4) carried by a pair of plates 62 secured at their toeward ends to the bracket 18 and at their heelward ends to an upstanding lug 64. The lower ends of the plates are further secured to a bottom plate 66. The bracket 48 threadably receives an adjusting screw 68 mounted for rotation in the plates 62 and having a knurled head 70. By rotating the screw 68 the bracket 48 and hence the entire activating unit carried thereby may be adjusted widthwise to suit the unit for operating on shoes having a variety of heel displacements relative to the center line of the shoe forepart.

For adjusting the heelward ends of the bands to suit the reversed curvatures of right and left shoes, a lever 72 (FIGS. 1, 2 and 7) is provided with upstanding headed pins 74 which are received in slots 76 in the bridges 28. The lever is fixed on a vertically disposed rod 78 mounted for rotation in the bracket 48. The lower end of the rod 78 (see also FIG. 5) receives a threaded handle 80 by which the rod 78 and the lever 72 may be swung to the position illustrated in FIG. 2 for operating on a right-hand shoe. As seen in FIG. 2 the holder 12 at the left side has been moved more toewardly and inwardly toward the center line of the shoe forepart than the right hand side by operation of the lever 72. Such a relative disposition of the holders 12 acts to impart different curvatures to the bands 8 as seen in FIG. 8 which is a view looking at the bottom of the shoe so that the relative positions of the parts between FIGS. 2 and 8 are reversed. As seen in FIG. 8 the bands at the right hand side have a shorter radius arranged more toewardly than that of the bands at the left side to suit the inside marginal contour of the insole bottom. As the holders 12 are moved oppositely, either heelwardly or toewardly by the lever 72, they are caused to move along lines converging toewardly as determined by the grooves 38 and 43 in the slides 40 and 44, respectively.

For adjusting the heelward ends of the bands widthwise to suit various size shoes there is provided a plate 86 (FIGS. 1 and 3) having slots 88 for guiding the plate lengthwise along upstanding portions of the bracket 48, the plate being further guided for movement on the upper ends of the side plates 62. The plate 86 has angular slots 90 which receive pins 92 depending from the slides 44, 46. At its heelward end, the plate 86 is provided with an upstanding portion 94 which threadably receives an adjusting screw 96 mounted for rotation in the lug 64 and having a knob 98. By manually rotating the screw 96 the plate 86 may be moved heelward or toeward to adjust the slides 40, 44 and the bridges 28 carried thereby widthwise to suit the heelward ends of the bands to shoes of various sizes.

Before the margin of the upper is wiped inward over the insole bottom the heat activating bands 8 are in the position shown in FIGS. 1, 6 and 7 in engagement with the insole bottom to activate the precoated thermoplastic adhesive on the insole to a molten state. For this purpose, the holders 10 and 12 (FIG. 7) are provided with heaters 100, 101 to impart heat to the bands 8 which may be of any flexible heat conductive material. When the margin of the upper is wiped in over the insole bottom, the bands 8 must be moved out of engagement with the insole to avoid interference. To this end, the bottom plate 66 (FIG. 1) which carries the side plates 62 and hence the entire activating assembly is provided with depending rods 104 arranged to slide heightwise in suitable bearings 106 in a main bracket 108 fixed to a portion of the machine frame 110. The upper end of a piston rod 112 of a cylinder 114 is fixed to the plate 66. The lower end of the cylinder is fixed at 116 to the bracket 108. The cylinder is provided with inlets and outlets 120, 121 for moving the piston rod 112 in heightwise directions. By admitting fluid under pressure through the inlet 121 the bands 8 are moved up into engagement with the insole bottom and by admitting fluid under pressure into the inlet 120 while exhausting the port 121, the entire assembly including the bands 8 is moved down away from interference with the inwiping movements of the upper margin.

It should be understood that the foregoing description covers only one embodiment of the invention and that the device described may be substantially modified and used in other types of machines without departing from the scope of the invention as set forth in the following claims.

Having thus described my invention, what I claim as new and desire to secure by Letters Patent of the United States is:

1. In a machine for lasting shoes in which the margin of a lasted shoe upper is secured to the bottom of an insole precoated with solidified heat activatable adhesive, means for heat activating the adhesive along the margin of the generally flat forepart of the insole bottom including, a plurality of spaced flexible bands arranged so the band edges are engageable with the precoated insole bottom, means for bending the bands causing said edges to form spaced extended lands extending lengthwise of the insole bottom and generally following the marginal contour of the insole, and means for heating the bands for activating said precoated adhesive.

2. A machine according to claim 1 in which the bands are heat conductive and arranged in two groups adapted to engage the margins of the insole bottom at opposite sides of the insole forepart.

3. A machine according to claim 2 in which the opposite ends of each group of bands are mounted in blocks holding the bands in spaced parallel relation for edgewise engagement with the insole bottom.

4. A machine according to claim 3 in which the blocks for each group of bands are adjustable in opposite directions to accommodate various size shoes.

5. A machine according to claim 3 in which the blocks holding the heelward ends of the bands are angularly disposed with respect to the blocks holding the toeward ends causing the bands to curve inwardly generally following the marginal contour of the insole.

6. A machine according to claim 5 in which one of said heelward blocks is adjustably disposed closer to the center line of the insole and more toewardly than the other of said heelward blocks causing one group of bands to assume a curve of shorter radius and more toewardly than the other group of bands to suit the curvature of said one group to contour of the insole at the inside margin.

7. A machine according to claim 6 in which the relative positions of said heelward blocks are selectively reversed at opposite sides of the shoe for adjusting the curvature of the bands to suit shoes of opposite hand.

8. A machine according to claim 6 in which said heelward blocks are guided toewardly during inward adjusting movements and heelwardly during outward adjusting movements.

9. A machine according to claim 8 in which members are provided for so guiding said heelward blocks, said members having grooves converging toewardly toward the center line of the insole along lines corresponding to the angular disposition of said heelward blocks.

10. A machine according to claim 9 in which a lever is provided for selectively moving said heelward blocks at opposite sides in opposite directions heelwardly and toewardly of the insole to suit the curvatures of the groups of bands to the contours of shoes of opposite hand.

11. A machine according to claim 9 in which said members at opposite margins of the insole are adjustable simultaneously in opposite directions widthwise of the insole to adjust the relative disposition of said groups of bands according to the size of shoe to be operated upon.

References Cited by the Examiner

UNITED STATES PATENTS

| | | | |
|---|---|---|---|
| 1,110,315 | 9/1914 | Eldridge | 12—12 |
| 2,182,834 | 12/1939 | Winkley | 12—12 |
| 3,164,852 | 1/1965 | Bowler et al. | 12—10.5 |
| 3,178,742 | 4/1965 | Vallhardt et al. | 12—12 |

PATRICK D. LAWSON, *Primary Examiner.*